United States Patent
Soh

(10) Patent No.: US 6,887,064 B2
(45) Date of Patent: May 3, 2005

(54) METHOD AND APPARATUS FOR PRODUCING NON-PLANAR FORMED PARTS USING COMPACTION MOLDING COMPOUNDS, AND PARTS FORMED USING SAME

(76) Inventor: Sung Kuk Soh, 30003 Hickory La., Franklin, MI (US) 48025

( * ) Notice: Subject to any disclaimer, the term of this patent is extended or adjusted under 35 U.S.C. 154(b) by 75 days.

(21) Appl. No.: 10/173,721

(22) Filed: Jun. 18, 2002

(65) Prior Publication Data

US 2003/0230827 A1 Dec. 18, 2003

(51) Int. Cl.⁷ .............................................. B29C 43/36
(52) U.S. Cl. ........................ 425/408; 425/411; 425/443; 425/454
(58) Field of Search ................................ 425/406, 408, 425/411, 412, 443, 453, 454, 451, 150

(56) References Cited

U.S. PATENT DOCUMENTS

| | | | | |
|---|---|---|---|---|
| 3,166,617 A | * | 1/1965 | Munk ........................ | 264/109 |
| 3,850,677 A | | 11/1974 | Vasishth | |
| 4,061,813 A | | 12/1977 | Geimer et al. | |
| 4,073,851 A | | 2/1978 | Munk | |
| 4,078,030 A | | 3/1978 | Munk et al. | |
| 4,131,664 A | | 12/1978 | Flowers et al. | |
| 4,248,163 A | | 2/1981 | Caughey | |
| 4,303,019 A | | 12/1981 | Haataja et al. | |
| 4,373,889 A | * | 2/1983 | Brown ........................ | 425/150 |
| 4,408,544 A | | 10/1983 | Haataja | |
| 4,440,708 A | | 4/1984 | Haataja et al. | |
| 4,559,194 A | | 12/1985 | Hegenstaller | |
| 4,559,195 A | | 12/1985 | Heggenstaller | |
| 4,790,966 A | | 12/1988 | Sandberg et al. | |
| 4,853,180 A | * | 8/1989 | Howard ........................ | 419/66 |
| 4,929,165 A | * | 5/1990 | Inaba et al. .................. | 425/150 |
| 4,960,553 A | | 10/1990 | DeBruine et al. | |
| 5,078,938 A | | 1/1992 | Munk et al. | |
| 5,100,601 A | | 3/1992 | Heggenstaller et al. | |
| 5,211,964 A | * | 5/1993 | Prytherch et al. ........... | 425/150 |
| 5,259,744 A | * | 11/1993 | Take ............................ | 425/78 |
| 5,455,002 A | * | 10/1995 | Kobayashi et al. ........... | 419/66 |
| 5,580,586 A | * | 12/1996 | Yokoyama .................. | 425/150 |
| 6,238,199 B1 | | 5/2001 | Schallenmueller et al. | |

FOREIGN PATENT DOCUMENTS

| | | |
|---|---|---|
| CN | 1154825 | 7/1997 |
| CN | 1198314 | 11/1998 |
| CN | 1246313 | 3/2000 |
| CN | 1247880 | 3/2000 |
| CN | 1256905 | 6/2000 |
| GB | 1403154 | 8/1975 |
| JP | 56015339 | 2/1981 |
| JP | 58033445 | 2/1983 |
| JP | 63118203 | 5/1988 |

\* cited by examiner

*Primary Examiner*—Benjamin L. Utech
*Assistant Examiner*—Thu Khanh T. Nguyen
(74) *Attorney, Agent, or Firm*—Carrier, Blackman & Associates, P.C.; Joseph P. Carrier; William D. Blackman

(57) ABSTRACT

Molding apparatus for producing non-planar parts using compaction molding compounds (CMC) comprises a mold having a cavity which receives CMC therein, the mold including a movable platen assembly having at least two plates movable in substantially parallel directions to compact CMC placed in the cavity, and an actuating mechanism which moves the plates simultaneously at different respective velocities such that the CMC is substantially uniformly compacted into a non-planar shape with a predetermined, substantially uniform density.

9 Claims, 14 Drawing Sheets

METHOD AND APPARATUS FOR PRODUCING NON-PLANAR FORMED PARTS USING COMPACTION MOLDING COMPOUNDS, AND PARTS FORMED USING SAME

BACKGROUND OF THE INVENTION

1. Field of the Invention

The present invention relates to an improved method and apparatus for producing formed or molded parts from molding materials that do not flow freely, which will be referred to as compaction molding compounds. More particularly, the present invention pertains to such a method and apparatus which can be efficiently used to mold high quality shaped or non-planar parts from inexpensive compaction molding compounds.

2. Description of the Background Art

In the art, compaction molding compounds (or CMC), as well as apparatus (molds, presses, etc.) and methods used to compact such materials into boards and other planar or nearly planar objects, are known.

Compaction molding materials have been commonly prepared by mixing suitable solid material such as wood chips, fiber, grain hulls, straw, sawdust, papermill sludge (see, for example U.S. Pat. No. 4,303,019), etc. or mixtures thereof with a suitable binder or binder mixture of synthetic resins or the like. For wood chips and powders, urea-formaldehyde resin, melamine-formaldehyde resin, phenol-formaldehyde resin, polyvinyl acetate resin, casein, polymeric diphenyl methylene diisocyanate resin (PMDI) are the most commonly used binders, as reported by Terry Sellers, Jr., in Forest Products J. vol. 51, No. 6, p 12 (2001). In the case of rice hulls, which may be used in whole or size-reduced form, phenol-formaldehyde resin (see, for example, UK Patent 1403154 and U.S. Pat. No. 3,850,677), polyurethane foam stock liquid (see, for example, Japanese Patent Publication 58033445), urea resin adhesive (see, for example, Japanese Patent Publication 58033445), synthetic rubber latex (see, for example, Japanese Patent Publication 63118203), and a variety of thermoplastic binders have been used. Mixture of rice husks and wood pulp has also been reported using various binders (see, for example, Japanese Patent Publication 56015339). Such conventional mixtures may be in loose particulate form if simple flat press is to be used to produce flat particle boards.

To shorten the cycle time of molding, U.S. Pat. No. 5,078,938 introduces hot gas or steam into press during pressing cycle. U.S. Pat. No. 6,238,199 describes gas channels in the mold and blocking devices to control the flow of the hot gas.

It is very desirable that the major solid content of the CMC may be waste materials of various industries, and thus can be obtained for little or no cost, e.g., wood chips from the lumber industry, papermill sludge, grain hulls, etc. Rice hulls and other grain hulls are particularly desirable for use as the solid content because they typically are available from the rice and grain processing industries in clean form and near uniform size such that no further processing is normally required to remove undesired matter, etc., unlike wood chips which must be processed to remove bark, etc. nor to grind for size reduction. Also, rice and grain hulls naturally contain a significant amount of silicon which gives improved strength and resistance to moisture and insect to parts produced from the CMC.

To produce shaped articles other than flat panels, preformed mats such as the loosely felted mats made of wood flakes described in U.S. Pat. Nos. 4,061,813, 4,248,163, 4,408,544, etc. have conventionally been used. These matted CMCs are furnished in a mold or a simple two-platen press and are compacted to reduce or eliminate voids and increase the apparent density of the formed parts. Hardening takes place by heating under compression so that the furnish is solidified in compacted cavity geometry. The molded density of the formed part correlates strongly with developed structural strength. However, the part will fail if any portion of the part is compressed beyond the compressive strength limit of the CMC. Especially when high part density is desired to develop high strength, it is essential to control the part density uniformly and below the compressive failure point. As solids have very low solid compressibility, the failure point is close to the point of nearly complete elimination of voids. If any portion of the furnish reaches such a limit during the compacting cycle, the mold can not be closed further without destroying the part and/or the mold. Even if the part does not fail, uneven compaction will often result in unacceptable and unintended variation of part density. On the other hand, if any portion of the part is subject to draw or stretching deformation, failure by void formation or tear will be observed.

Due to the above-discussed considerations and restrictions on operating conditions, successful molding of CMCs has been limited to very simple part geometry which only requires very small deformation from flat sheet geometry of the preformed mat or initial furnish. For example, Canadian Patent Nos. 1154815, 1198314, 1246313, 1247880, 1256905 describe use of plant fiber, grain husk, straws, stalk, etc. to form biodegradable dishes. The geometry of dishes deviates very little from flat panels, requiring almost no draw during forming. Compaction using male and female dies in a simple press is sufficient to compact the furnish to produce the final shape. Similarly, U.S. Pat. No. 4,061,813 describes pressing a preformed mat to form a corrugated shape suitable for use as building material. In this case, the degree of draw may be somewhat higher than that needed for forming tableware but still remains relatively small. U.S. Pat. No. 4,131,664 describes compaction of composite mats to produce automotive acoustic panels, which also requires very small draw or deformation. Otherwise, the mat easily tears apart during compaction if the mat is pulled by the draw. Even if it does not tear, the draw decreases the density or forms voids, counteracting the desirable effect of compaction. Numerous patents, including U.S. Pat. Nos. 4,248,163, 4,408,544, 4,440,708, 4,790,966, and 4,960,553, have attempted to mitigate this damage from draw in forming shipping pallets. The disclosed designs are mostly flat or planar, but legs had to be drawn from planar preformed mats. These patents report such difficulty in producing structurally sound drawn legs that they had to invent many additional steps to form the legs, such as interrupting the molding process to add more furnish in the drawn area or forming the drawn area in a separate molding step before the planar section is overmolded. U.S. Pat. No. 4,073,851 teaches use of pourable particulate compaction molding compound to produce nearly constant thickness drawn walls by using a stepped die which restricts material pushed down and a matching wedge die which pushes the molding compound into a cavity, creating a draft angle. U.S. Pat. No. 4,078,030 teaches matching the die cavity thickness profile which will minimize or compensate the effect of draw. Such a technique, while it may be useful for certain cases, forces loss of design flexibility as the design is dictated and limitations put on it by the requirement of trying to counteract the effect of draw that creates density variation or void formation.

With the conventional practices described above, which use a simple two-platen press, some curved surfaces may be formed in one step from flat preformed mats or furnish, but the geometry of parts that can be formed thereby is very limited and the produced part has to be thinner in the drawn portion thereof. Molding parts with multiple thicknesses with uniform density and structural integrity is not possible with this conventional technology.

There have been few reported cases of using multiple-platens or pistons to compaction mold fully three-dimensional shapes. U.S. Pat. Nos. 4,459,194, 4,459,195 and 5,100,601 describe compaction molding I-beams, railroad ties and similar long elongated structural members with constant crosssection from a mixture of cellulosic particles of various length (pin chips), which are described as reacting to compaction force by superficial orientation and surface hardening. Vertically moving platens and horizontally moving platens are used to compact the four sides of the structural member profile. These movable walls are actuated sequentially and repeatedly, similar to repeated hammer blows on four sides, to bring about the superficial orientation and surface hardening. Applicability of the technology disclosed in these patents is limited to formation of elongated structural beams, and the forming operation is limited to the specific sequence and magnitude of platen movements described.

Otherwise, there are significant differences between the technology of the discussed patents using a simple two-platen press or variation thereof as described above and the technology according to the present invention as discussed herein. For example, the resulting part density distribution pattern achieved with the technology of the discussed patents is quite non-uniform and dependent upon the part geometry except when flat board of uniform thickness is produced, while the present invention produces uniform density if that is desired or produces controlled variable density if that is desired for a variety of complicated part geometries.

The goal of complicated platen movement in the listed patents is to introduce favorable particle fiber orientation on the part surface. This will be useful only when the compacting compound does not transmit compacting pressure uniformly through the part thickness, only creating superficial deformation and orientation near the surface, and is incapable of producing a uniform compaction condition such as is achieved by the present invention. Correspondingly, the compacting material suitable for use in the patented technology will not be suitable for use in forming compacted parts with the simple two platen press or according to the present invention, and vice versa. In addition, the device of the patents requires some movable platens or walls to move perpendicular to others, and the compacting movements are actuated in sequence one at a time, unlike the simple press or the present invention. When two or more platens move simultaneously in the method and apparatus of the listed patents, they only duplicate the movement of a simple press.

As will be understood from the foregoing, although various CMCs and apparatus and methods for processing same are known, the conventional apparatus and methods have significant limitations and restrictions associated therewith. A great need still exists in the art for a compaction molding apparatus and method which can be efficiently and economically used for forming a variety of part geometries with greater design freedom, geometries that have been previously considered impossible to mold in one molding cycle.

SUMMARY OF THE INVENTION

The present invention fulfills the discussed need in the art.

According to one aspect of the present invention, there is provided molding apparatus for producing non-planar parts using compaction molding compound (CMC), the apparatus comprising: a mold having a cavity which receives CMC therein; the mold including a movable platen assembly having at least two plates movable in substantially parallel directions to compact CMC placed in the cavity; and an actuating mechanism which moves the plates substantially simultaneously at different respective velocities such that the CMC is substantially uniformly compacted into a non-planar shape with a predetermined, substantially uniform density.

Such apparatus according to the invention is very desirable because it is relatively simple in structure and operation, and yet is capable of forming high quality non-planar parts with relatively complex geometries, deviating substantially from flat panels.

According to another aspect of the present invention there is provided a method of forming parts from CMC using a mold including a cavity which receives CMC therein and at least two plates movable in substantially parallel directions to compact CMC placed in the cavity; the method comprising the steps of: filling the mold cavity with CMC; and moving the plates substantially simultaneously at different respective velocities such that the CMC is substantially uniformly compacted into a non-planar shape with a predetermined, substantially uniform density.

Again, such method according to the invention is very desirable because it is relatively simple in operation, and yet is capable of forming high quality non-planar parts with relatively complex geometries, deviating substantially from flat panels.

According to preferred aspects of the invention, in the discussed apparatus and method, the mold cavity includes portions having different lengths in the given direction, such that non-planar parts formed with the apparatus include portions having different dimensions in the given direction; the cavity initially has substantially the same shape as a formed part except that it is elongated by a compaction ratio of the CMC in the given direction; a compacting operation of the apparatus is unidirectional and uninterrupted; the CMC is compacted to a density approaching the failure point of the CMC; before compaction of the CMC begins, the CMC is completely filled into the cavity without any gaps or voids between the surfaces of the mold and the CMC; the controller controls the movements of the plates such that a rate of deformation is substantially uniform for all portions of the CMC at any given time during a compacting operation, and such that movement of the CMC other than in the parallel direction is substantially prevented, at least at an ending part of the compacting operation when the CMC forms a cohesive compacted mass.

It is an object of the present invention to provide a method and apparatus for efficiently forming high quality, high strength parts using CMC, wherein the formed parts are non-planar with relatively complex geometries deviating substantially from flat panels.

It is a further object of the present invention to provide such a method and apparatus which are relatively simple in structure and operation.

It is another object of the present invention to provide such a method and apparatus which are relatively low in cost.

It is still another object of the invention to provide such a method and apparatus which can use CMCs having a solid content derived primarily or exclusively from the waste products of various industries, including rice hulls, other grain hulls, wood chips and dust, papermill sludge, etc.

For a more complete understanding of the present invention, the reader is referred to the following detailed description section, which should be read in conjunction with the accompanying drawings. Throughout the present specification and in the claims, all references to percentages are intended to mean percent by weight unless otherwise specified. Throughout the following detailed description and in the drawings, like numbers refer to like parts.

BRIEF DESCRIPTION OF THE DRAWINGS

FIG. 5(a) is a sectional front view of the apparatus taken along line A—A in FIG. 5(b), while

FIGS. 6(a)–7 depict planar parts having opening(s) defined there through, and a molding apparatus including a loose core (as may be used with the present invention) used to form the part in FIG. 6(b), and specifically FIG. 6(a) is a perspective view of planar part with molded-in holes forming lattice pattern, FIG. 7 is a split cross-sectional front view of an apparatus used to form the planar part of FIG. 6(b), with the left half of FIG. 7 showing the apparatus in a pre-molding condition, and the right half of FIG. 7 showing the apparatus in a fully compacted condition.

FIG. 9(a) is a split cross-sectional front view of the apparatus taken along line A—A in FIGS. 9(c) and 9(d) showing the state of the apparatus at the beginning (left side) and end (right side) of a compacting operation, similarly FIG. 9ba) is a split cross-sectional rear view of the apparatus taken along line A'—A' in FIGS. 9(c) and 9(d) showing the state of the apparatus at the beginning (left side) and end (right side) of a compacting operation, while

DETAILED DESCRIPTION OF PRESENT EMBODIMENTS OF THE INVENTION

Figure 1:
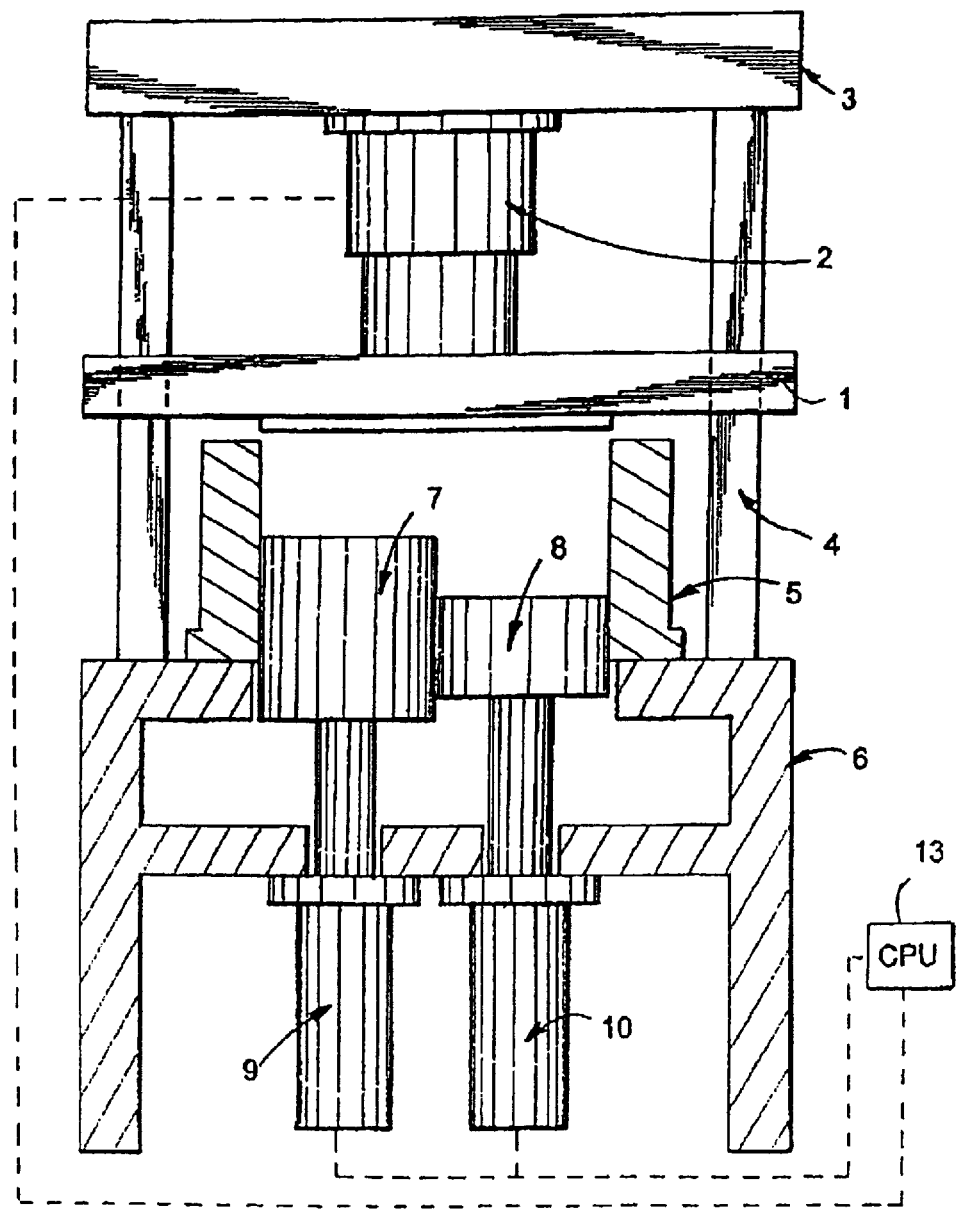
FIG. 1 is a sectional front view of a simple compaction molding apparatus according to an embodiment of the invention.

The present invention teaches the construction of various apparatus and methods of molding parts of complex shapes with compaction molding materials (or CMC). Description is presented below of several different embodiments of molding apparatus according to the invention. Prior to describing specific apparatus, however, a discussion is presented of method or processing conditions which are met by all of the different molding apparatus in forming non-planar parts according to the invention.

Molding Methods of the Invention

In order to produce desired part shapes while maintaining integrity and uniformity of material properties of the CMC, it is important to understand what conditions are preferably met during the molding of such material. The various apparatus and methods of the present invention recreate and maintain such conditions. Particularly, the inventor discovered that when the six conditions listed below are met during a molding cycle, geometrically complex non-planar parts with uniform density and other advantageous properties can be molded in the one cycle. Here, the emphasis is on producing uniform part density while molding complex geometries with multiple levels of thickness in the direction of compaction. Uniform density is the usually desirable quality, which the conventional methods and apparatus discussed above had much difficulty in achieving even for parts that require relatively small draw. However, this does not exclude from the scope of the present invention intentional production of parts having variable density if that is desirable. With the present invention, such intended variation, if necessary, can be easily achieved in produced parts, unlike conventional practices such as those discussed above, where there is little control of density variation other than changing part design. By the present invention, variable density on a plane perpendicular to the compaction direction can be precisely engineered within a compaction limit of the furnished CMC.

The Six Conditions

1. First, the initial charge or furnish of CMC should be distributed in such a way that uniform density of molded part can be achieved by compacting in one direction (e.g., Z-axis) to final dimension without causing any material redistribution or flow in any direction perpendicular to the one direction (e.g., in X-Y directions). For purposes of this disclosure, the Z direction refers to the direction of press movement and the X-Y directions lie on the plane perpendicular to the Z direction. Normally, they should correspond to vertical and horizontal directions, respectively, but any such correspondence is not a requirement of the present invention. The shape of the space filled with CMC charge at the start of a compacting operation or cycle corresponds to the molded part geometry except that it is elongated by the appropriate compression ratio in the Z-direction. Thus, the geometry of charge space and that of final part are Z-directional elongation while preserving the dimensions in XY plane. Somewhat simplistically, the geometry of parts formed according to the invention can be described by mapping, e.g., let the coordinates of a material point of the initial furnish of the CMC be (x-x0, y-y0, z-z0) where (x0, y0, z0) is the coordinate of a reference material point and compaction proceeds in the Z direction only, then the material coordinate of the same material point after molding will be (x-x', y-y', c(z-z')) where c is the compaction ratio and (x', y', z') is the coordinate of the reference material point after molding.

2. Second, when the molding apparatus is to begin compacting, the outer boundaries of the CMC furnish should be in contact with adjacent mold surfaces without any air gaps or voids there between before any pressure of compacting is applied. Compacting should start when the charge space is uniformly filled with molding material without any such air gaps. Failure to accomplish this will result in a portion of CMC beginning to compact while other portions remain uncompacted, resulting in non-uniform compression. Generally, the CMC furnish will be loaded into the molding cavity by simply pouring the CMC into the top of the cavity and removing excess CMC by passing a squeegee or the like over the top of the cavity. Optionally, air or another gas may be blown into the cavity, e.g., from the lower platens, during furnishing to stir the CMC gently helping it to settle into the cavity.

3. Third, in order to prevent uneven compaction, the rate of deformation should be kept uniform for all points or portions of the CMC furnish. This rate may change with time, as long as spatial uniformity is maintained during molding. This means that the relative velocity of approach of any two material points of the CMC on a common (Z) axis will be proportional to their distance of separation. Furthermore, the proportionality constant will be the same everywhere in the cavity space of the molding apparatus. Such a molding operation with uniform rate of deformation will be referred to as uniform unidirectional compaction (or UUC) in the present disclosure.

4. Fourth, any discontinuity in displacement field of the CMC furnish should be avoided, at least at the end of compacting cycle when the charge forms a cohesive mass. At an earlier stage of the compaction cycle, when the charge does not have any cohesion, sliding of layers may be tolerated without effect. If such a discontinuity does not take place when uniform unidirectional compaction (UUC) is performed, the velocity of material movement will be uniform across the X-Y plane. Therefore the relative velocity of approach of any two material points will be proportional to their difference in Z coordinate. Furthermore, the proportionality constant will be the same everywhere in the cavity space. Such a deformation will be referred to as compatible uniform unidirectional compaction in the present disclosure.

5. Fifth, the temperature of the charge should be uniform.

6. Sixth, the charge should be well mixed or homogeneous to the extent that the binder used, physical or chemical, will create consistent and uniform binding throughout the compacting part.

Among the listed six conditions, the first four define the compacting movement of the molding device. A coordinated movement of the movable plates or other movable components of the molding apparatus should satisfy the discussed uniform unidirectional compaction conditions.

Moldable Part Shape of the Invention

Figure 12A:
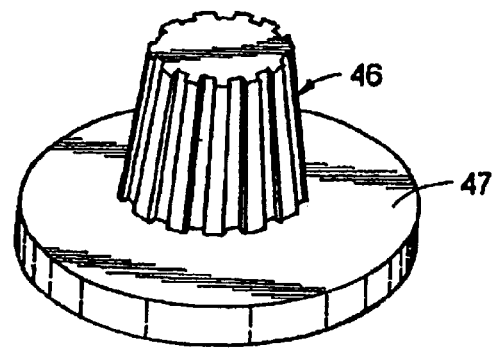
FIG. 12(a) is a perspective view of a part having a serrated wall with draft angle.
Figure 12B:
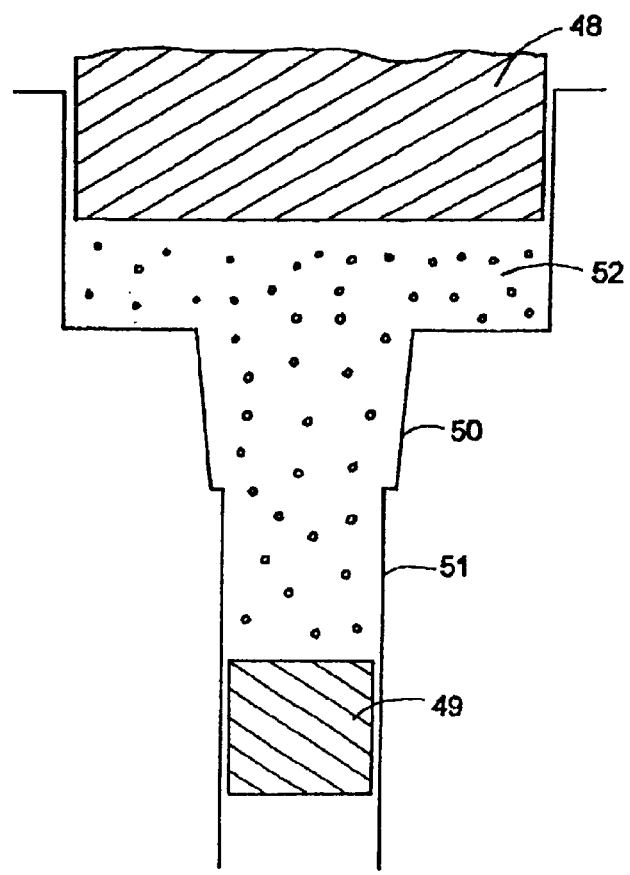
FIG. 12(b) shows the arrangement of cavity space during compaction process.

The present invention produces parts with the unidirectionally elongated shapes discussed under UCC condition 1. Other part shapes that are close to the unidirectionally elongated shapes can also be made by the present invention. Any deviation of part geometry from the unidirectionally elongated shape will result in nonuniformity of density and other material properties as the corresponding molding condition will also deviate from the UCC condition. However, it may be acceptable for the intended end use, and if so, it may be used advantageously to mold in detailed features difficult to produce otherwise. For example, draft angle may be introduced which will facilitate part ejection after molding. Another example is introducing small scale textures in the part surface. Such features may be formed in the cavity at the completion of compaction cycle without the need for them to be present in the part of the cavity which will be outside of the final compacted part geometry. This is illustrated in FIGS. 12(a) and 12(b). FIG. 12(a) shows a part with serrated wall with slight draft angle (46) and flat base (47). FIG. 12(b) shows a cavity arrangement which produce the part. The moving platens (48) and (49) moves in parallel and opposite directions to compact the furnish (52). The deviation from the size conditions is observed as the details of a serrated wall are formed in the shape of cavity section (50) while the compacting area (51), which is outside of the final compacted part geometry, is made with a simple cylindrical column shape.

Molding Apparatus of the Invention

A molding apparatus according to the present invention generally will comprise the following functional components in its simplest embodiment:

1. A frame wall which surrounds a cavity space between an upper or fixed platen, and a lower or movable platen assembly.

2. The upper platen which will cover the CMC charge and establish a constant z-plane, where z refers to the spatial coordinate in platen moving direction.

3. The lower platen assembly which forms the lower z surfaces of the part and is capable of moving in coordination to form UUC movement, includes a plurality of movable platens.

4. When the part has one or more through-holes in the z-axis direction and/or one or more x-y planes at lower z-levels than the upper platen, one or more loose inserts which can change their attachment platen between the upper platen and lower platen assembly.

5. An actuator assembly, such as a set of hydraulic cylinders, double pitched lead screws, and/or electrical motors, which makes a coordinated movement to form UUC movement of the lower platen assembly.

Again, the directions and orientations of the molding apparatus nominally indicated above are in no way intended to limit the invention. For example, the apparatus need not be oriented vertically, but could be diagonally oriented, the movable platen assembly could be disposed at the top of the molding apparatus, movable platens could be disposed at opposite ends of the molding cavity for coordinated movement in opposite directions, but along the same axis, etc.

Flat planar parts with constant thickness or substantially constant thickness have a trivial geometry that can be produced with the simple conventional molding presses discussed above, having one movable platen pressing against a fixed platen. In order to produce non-trivial geometry with multiple levels of thickness, the present invention requires two or more moving platens which are moved while maintaining predetermined constant velocity ratios against a fixed part of the mold. In addition, the cover platen normally should move separate from the fixed part (usually a frame wall or walls). Thus the apparatus of present invention will typically involve four or more separate platens. One may conveniently be fixed, such that at least three separately movable platens form portions of the part geometry, and of such movable platens, two or more will be moved in precise coordination in order to maintain velocity ratios thereof. The inventor is not aware of any previous existence of such machines.

As will be understood, the molding apparatus according to the invention can be used to form a variety of part geometries as described in the moldable part shapes discussed above, and again, without limiting the invention relative to any particular orientation in the x, y, z directions.

All the parts formed using the molding apparatus according to more specific embodiments of the invention as discussed in the following description satisfy these geometrical characteristics and can be desirably molded in one molding cycle to produce the final part geometry.

Automation and Control of the Molding Apparatus of the Invention

Although it is theoretically possible to operate the molding apparatus of the invention described above manually, a certain level of automation and control will be needed in practice for safety, accuracy, and repeatability. Programmable logic controllers and the like may be used to actuate an appropriate sequence of actions. Limit switches, sensors, and transducers may be used to determine the state of control variables and solenoid switches and control valves may be used to manipulate control variables for the case of hydraulic or pneumatic actuator systems, and equivalent control elements may be used for other electromechanical actuator systems. Installing instrumentation and implementing control algorithms for a molding press is already a well established art and may be freely adapted for the molding apparatus of the present invention. One control objective that is not commonly found in other molding apparatus, but is of paramount importance for the molding apparatus of this invention is maintaining constant velocity ratio of two or more simultaneously moving platens as required to satisfy the UUC conditions.

Figure 13:
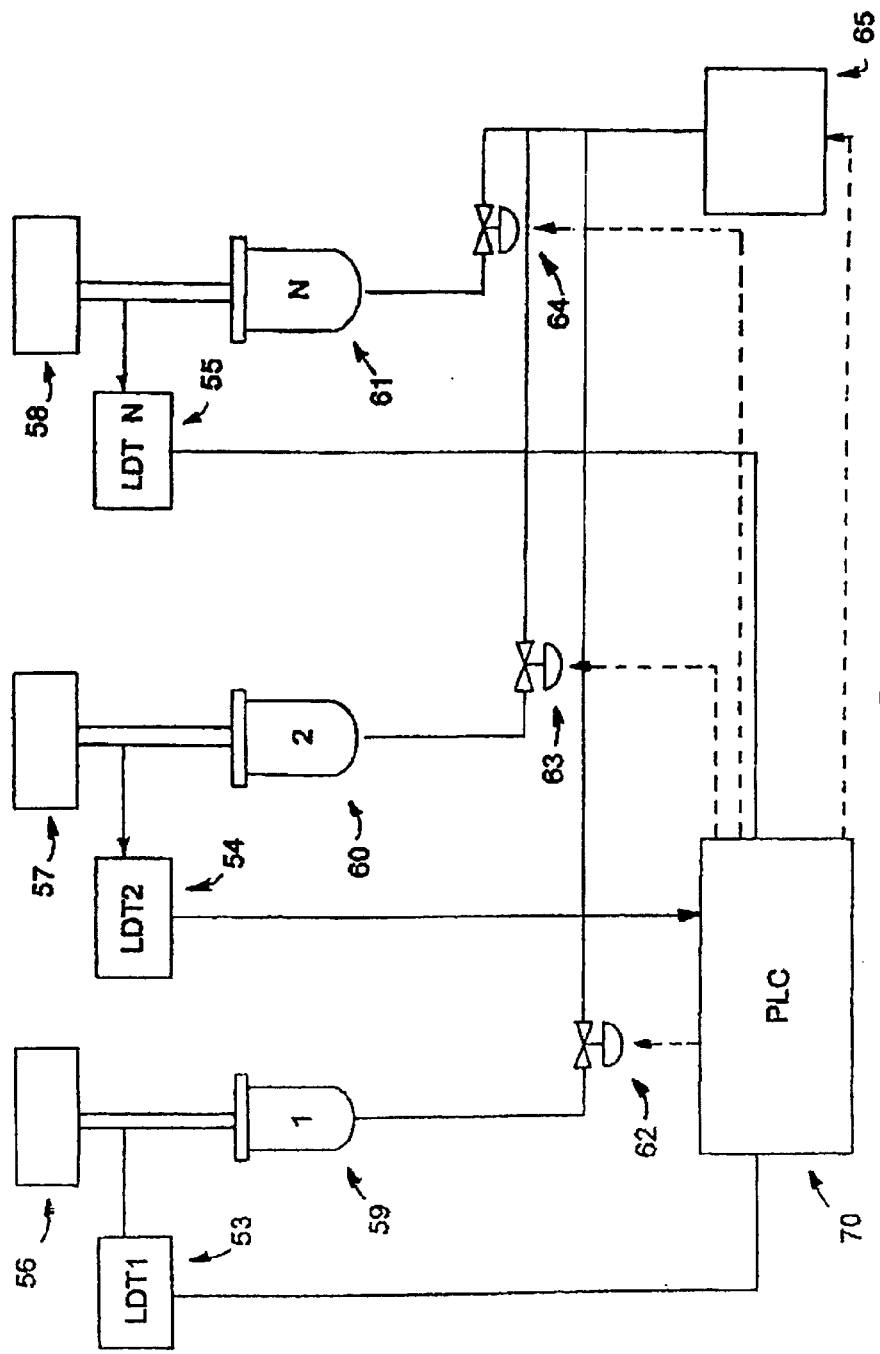
FIG. 13 illustrates one embodiment of a control scheme used to maintain relative velocity ratio of actuators constant while moving them simultaneously according to the invention.

One method of achieving the stated control objective is to use independently operatable actuators such as hydraulic cylinders and control their actions preferably with the aids of sensors and transducers. FIG. 1 shows an embodiment of the molding apparatus of the present invention that requires the two hydraulic cylinders (9) and (10) to actuate in coordination under constant velocity ratio to satisfy the UUC condition. FIG. 13 shows a control scheme to accomplish the stated method: As shown, there are a number N (here three) of moving platens (56, 57, 58) which are to move simultaneously in coordination. Actuators (59, 60, 61) push the platens, respectively. If hydraulic or pneumatic cylinders are used, it is advisable to have the starting positions and the final positions of the cylinders fixed by using self locking cylinders. Again, the control objective during a compaction stage is to maintain constant velocity ratio. Such a control objective may be achieved by various control strategies, but according to this embodiment the positions of compacting platens (56, 57, 58) are measured with linear displacement transducers (LDT) (53, 54, 55), instead of trying to measure the velocities directly. The remaining displacements D1, D2, ... DN of cylinders (59, 60, 61) are described by the mathematical formula $$D1 = d1 - d1\text{ref}$$

$$D2 = d2 - d2\text{ref}$$

$$\ldots$$

$$DN = dN - dN\text{ref}$$

Where d1, d2, ... dN are the displacement measurements coming from the LDTs (53, 54, ... 55) and d1ref, d2ref, ... dNref are the target displacement values at the end of the compaction cycle. Then the control strategy maintains the ratio of D1, D2, etc. at predetermined constant value(s). Optionally, corrective actions may be taken to compensate for the measured deviation dynamically, i.e., while the compaction movement is still taking place. During the compaction stage, hydraulic fluid from a source is supplied through a hydraulic manifold (65). Control valves (62, 63, 64) are placed between the manifold and the cylinders. The relative flow rate ratios of hydraulic fluid flowing into the cylinders determine the relative velocity ratios. The flow rates are in turn controlled by control valves by the control signals from the programmable logic controller (70), which also controls the operation of solenoid valves in the distribution manifold (65) which controls distribution of hydraulic fluid of the entire machine. The stated control objective is to maintain the relative ratio of moving velocities, so if each actuator is equipped with a control valve, one may be used to set the desired trajectory as a function of time D(t). If the number one cylinder is selected as such a reference actuator, its feedback control action is implemented by changing the flow rate Q by the formula $$\Delta Q1 = K1(D1 - D(t))$$

where Q1 is the flow rate through the control valve (59) and K1 the controller gain. For the rest of the actuators, their control action may be determined relative to the reference cylinder position, $$\Delta Q2 = K2(D2 - C2\, D1)$$

$$\ldots$$

$$\Delta QN = KN(DN - CN\, D1)$$

where C2, ... CN are the desired velocity ratios relative to platen 1 velocity. As the velocity is a time derivative of the measured displacement, this control scheme is a variation of what is known as an integral control action. The control algorithm described here is known as an integral control algorithm and works well for this particular implementation.

Figure 14:
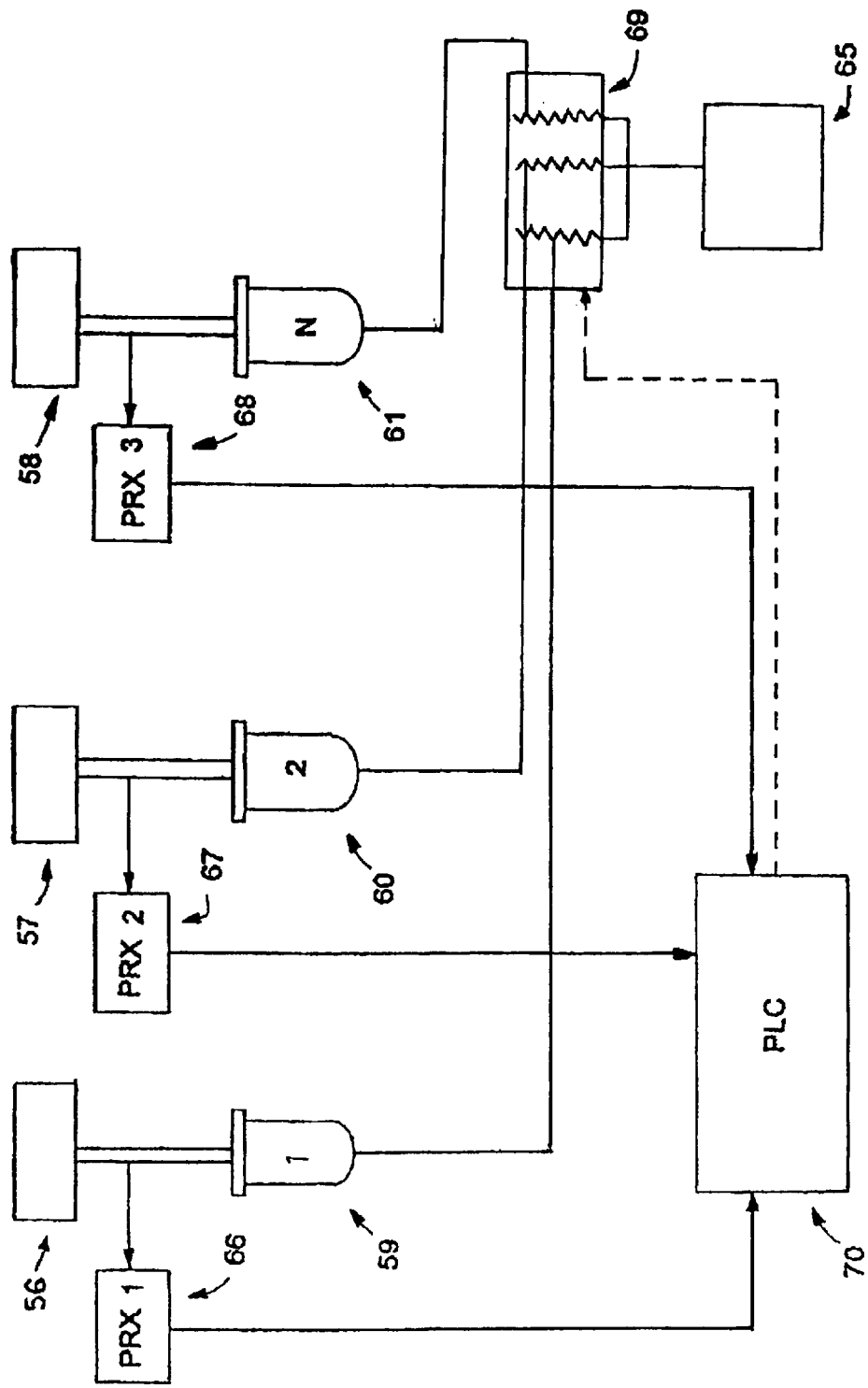
FIG. 14 shows another embodiment of a control scheme for tuning the compaction movement of acuators according to the invention.

Another embodiment of control apparatus according to the invention for maintaining constant velocity ratios is shown in FIG. 14. In this embodiment, the relative flow rates into control cylinders are fine-tuned by adjusting flow resistances in the resistance manifold (69). During each compaction cycle, no dynamic feedback control takes place. Therefore the cylinders may reach the final positions at slightly different times deviating from the desirable simultaneous arrival. The tuning of resistance is such that the observed deviation is within a tolerable level, or otherwise the compaction may fail. The precise moment of reaching the final positions may be sensed by proximity or limit switches (66, 67, 68). The internal timers in the programmable logic controller (70) records them. The corrective action is taken by adjusting the resistances in the manifold (69) for the next cycle. This scheme, although it lacks the dynamic feedback control of the first embodiment, still works well and is easier and less expensive to implement. The resistance manifold (69) could be replaced with a gang of valves that would achieve the same function.

Figure 5A:
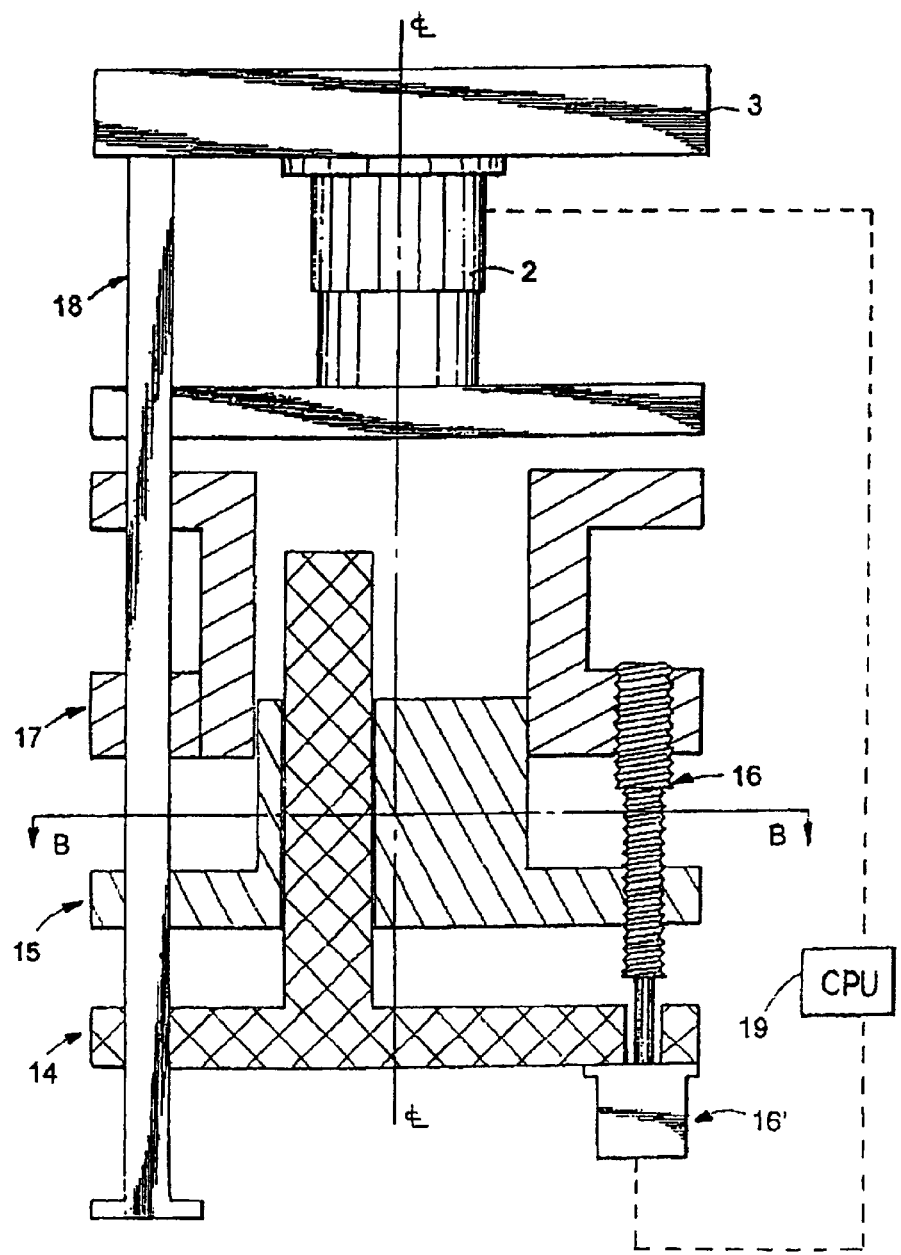
FIGS. 5(a) and (b) show a compaction molding apparatus according to another embodiment of the invention which is used to produce the part shown in FIG. 4, and specifically

Yet another method of maintaining constant velocity ratios of moving platens according to the invention is by employing mechanical setup where the velocity ratio is mechanically fixed and not subject to change. FIG. 5(a) shows a specific embodiment of molding apparatus implementing this method by using double pitched lead screw assembly (16), as discussed further below. As platens (17) and (15) are actuated by the same lead screw but the displacement is determined by the fixed pitches of the lead screw, their velocity ratios will remain constant even as the rpm of the motor changes.

Specific Embodiments of Molding Apparatus According to the Invention.

Figure 2:
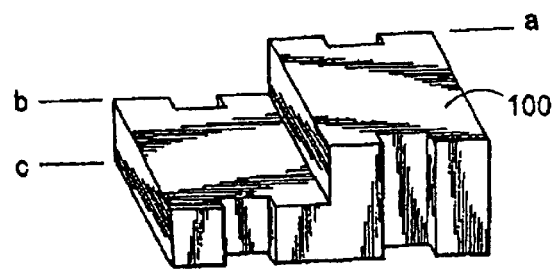
FIG. 2 is a perspective view of a part formed using the apparatus of FIG. 1.
Figure 3:
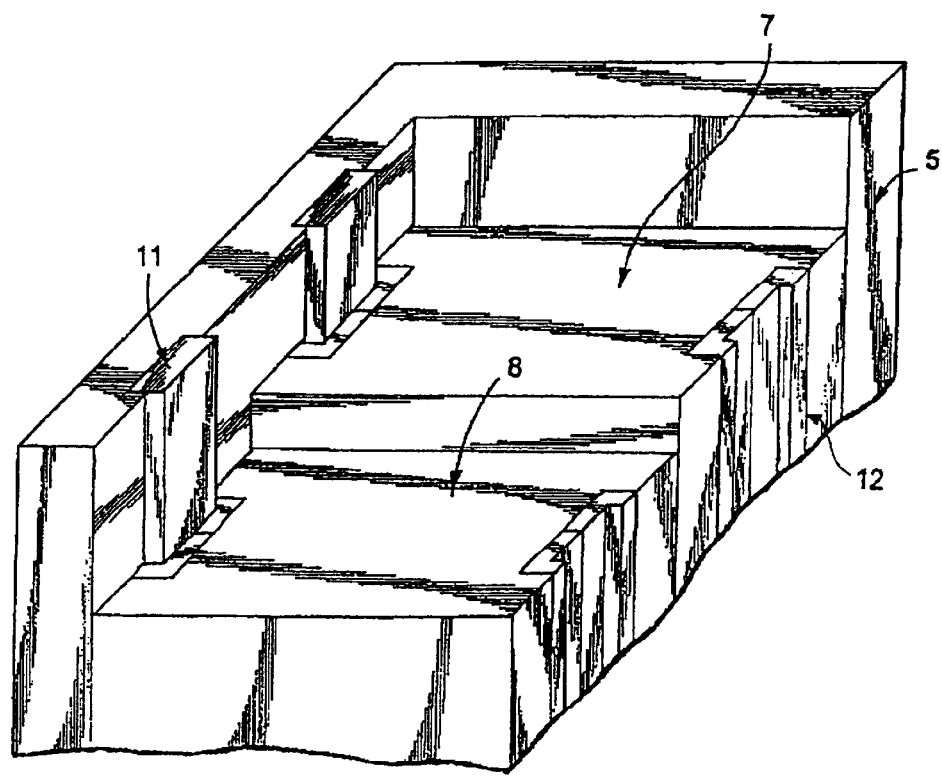
FIG. 3 is an enlarged perspective view of a portion of the apparatus in FIG. 1, particularly showing an alignment and guiding mechanism of moving plates of the apparatus.

FIGS. 1 and 3 depict an example embodiment of a solid molding apparatus that produces the sample non-planar part (100) shown in FIG. 2. It is selected as it is a design that can be made by the simplest solid molding machine that still has the essential characteristics of apparatus according to present invention. Specifically the apparatus includes a cover plate (1) movable by an hydraulic cylinder (2) supported by an upper fixed platen (3). The movement of cover plate is guided by tie bars (4). A wall frame (5) is bolted down to a pedestal (6). A lower platen assembly includes movable cores or plates (7) and (8) which are actuated by hydraulic cylinders (9) and (10), which are controlled by a controller (13) such as a PLC (programmable logic controller) having an appropriate control program, data table(s), etc. stored therein. Locking cylinders supplied by Locking Cylinder Technologies, Racine, WI can be locked at fully extended positions are quite suitable for this embodiment. By appropriately controlling movement of the core plates (7) and (8), two different thickness corresponding to the separation of plane pairs (ac) and (bc) in the part (100) depicted in FIG. 2 can be produced. The four notches in FIG. 2 are formed by the protrusion of wear plates (11) as shown in FIG. 3. It is important for the smooth and repeatable actuation of core plates (7) and (8) to provide guide and alignment features. In this embodiment, such guide and alignment features include the wear plates (11) embedded in the wall frame (5) and bolted to the wall, and an L-gib assembly (12) bolted to the core plates (7) and (8). Suitable wear plates and L-gibs are supplied by variety of producers such as DME Company of Madison Heights, Mich. Also, air poppet valves such as supplied by DME company, may be installed to supply hot air, steam, etc. into the cavity through the moving plates (7) and (8) for purposes of settling the CMC charge into the molding cavity and/or to shorten the cycle time of molding. Except for the contact areas in the wear plate-L-gib assembly, other moving and stationary plates do not touch each other even though there should be no gap big enough for molding compounds to become trapped in.

As shown in FIG. 2, the non-planar part (100) formed using the apparatus of FIGS. 1 and 3 includes a thicker section defined between horizontal planes a and c, and a narrower section (approximately half as thick) defined by planes b and c, and extending continuously from the thicker section. The geometry of the part (100) deviates significantly from a flat panel or a dish as conventionally formed using CMC.

If the formed part (100) sticks to the walls or forming surfaces of the molding apparatus, additional features to aid easy and consistent ejection of the part may be combined with the molding apparatus. Such features are not, however, depicted in the FIG. 1 apparatus in order to highlight the essential and important elements of present invention, and avoid overcrowding of the illustration.

Figure 4:
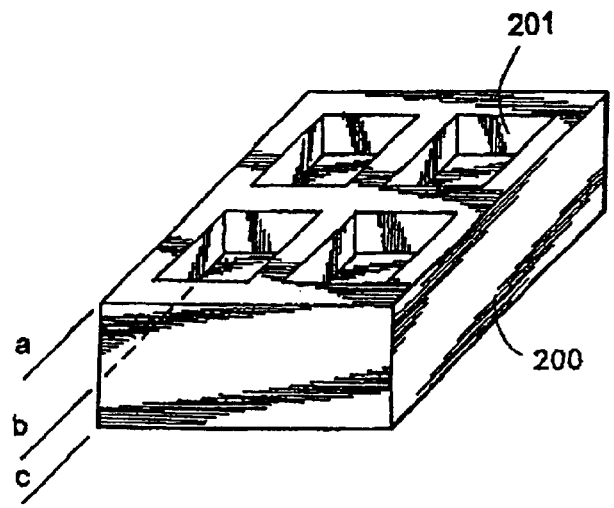
FIG. 4 is a perspective view of another part formed according to the present invention with sections of two different thicknesses forming a complicated repeating pattern.
Figure 8:
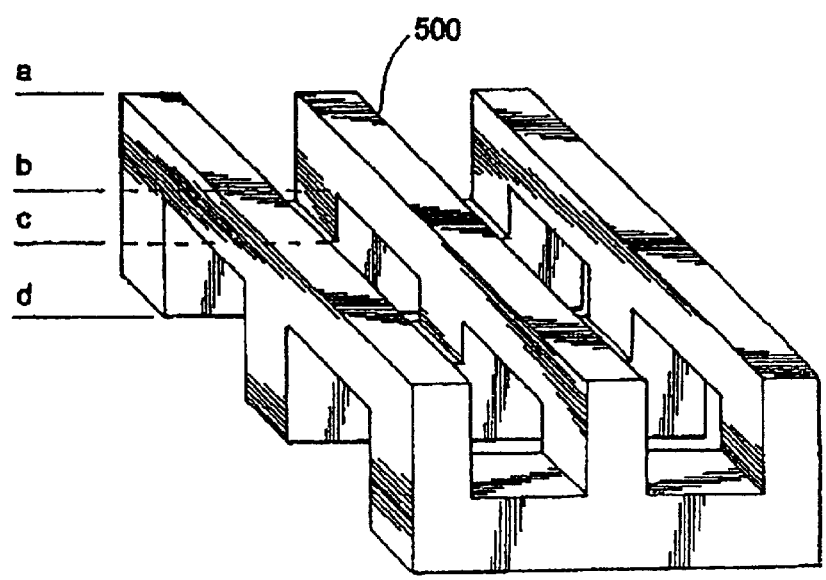
FIG. 8 is a perspective view of a more complex part formed according to the present invention with sections of three different thickness.
Figure 5B:
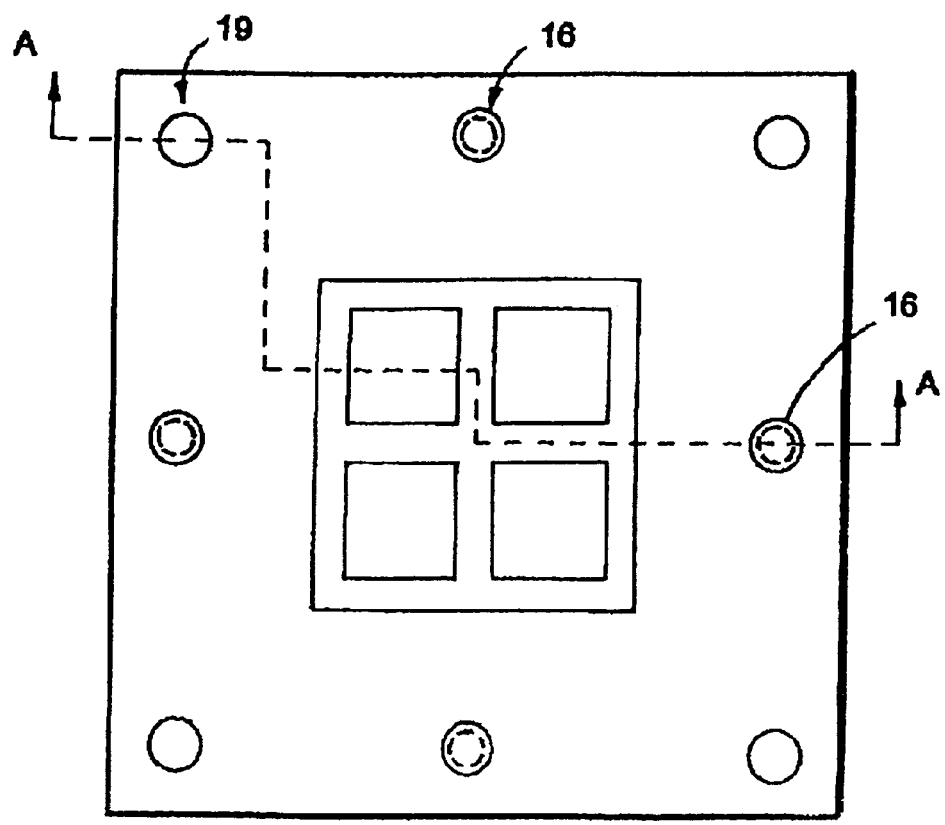
FIG. 5(b) is a top cross-sectional view of the apparatus.

Referring to FIGS. 4, 5(a) and 5(b), there are shown a molding apparatus according to another embodiment of the invention and a part (200) molded using the apparatus. Particularly, FIG. 4 depicts the part (200) having two different thicknesses corresponding to the distances among the three horizontal planes a, b, and c, somewhat similar to the part (100) in FIG. 2, but with added complexity as the sections of differing thickness form a repeating pattern of recesses (201) which extend approximately half way down into the full thickness of the part. Cross-sectional views of the molding apparatus that produces the part (200) are shown in FIGS. 5(a) and (b). FIG. 5(a) shows a front cross-sectional view of the apparatus along the line A—A in FIG. 5(b), while FIG. 5(b) shows a planar cross-sectional view of an intermediate section of the apparatus along the line B—B in FIG. 5(a).

Wear plates are not used in this embodiment of the molding apparatus because proper alignment of all moving and stationary plates is achieved using a plurality of vertically extending tie bars (18). As depicted, four of the tie bars (18) may be used, and disposed at the four corners of the apparatus. This embodiment also includes an upper cover plate (1) which is actuated by a hydraulic cylinder (2). A platen assembly includes movable core plate (14) forming the part thickness (bc) in FIG. 4 nested with another movable core plate (15) that forms the part thickness (ac), and these movable core plates are actuated by a plurality of the double pitched lead screw mechanisms (16) in cooperation with a wall frame (17). The lead screw mechanisms (16) are controlled by controller (19), again, such as a PLC having an appropriate control program, data table(s), etc. stored therein. As depicted, four of the mechanisms (16) may also be used, disposed in regularly spaced relation between pairs of the tie bars (13), respectively. Each of the mechanisms (16) includes an electric motor (16') which is bolted to the core plate (14), and a lead screw which is rotated by the motor (16') and includes lower and upper portions having threads with different pitches which respectively, operatively engage threaded nuts embedded in flanges of core plate (15) and wall frame (17). In this embodiment involving the double pitched lead screw mechanisms (16), UUC movement of the core plates (14, 15) relative to the CMC furnish in the mold cavity is achieved primarily through proper selection of the different pitches of the lead screw mechanisms, which in turn establish the velocity ratio of the movable core plates (14, 15). The controller (19) provides synchronized electrical power to the motors (16') of the mechanisms (16) for driving same.

Operation of the molding apparatus (200) is as follows. With top cover (1) closed, uniform coordinated compaction of CMC furnish in the cavity of the molding apparatus takes place by the rotation of the four motors (16') that drive the four double pitched lead screws (16). The four motor-lead screw assembly must turn in synchronized fashion. As the motors are bolted to the core plate (14), and as the lead screws must rotate through the nuts embedded in the flanges of core plate (15) and wall frame (17), coordinated movement of core plates (14) and (15) is achieved, again, with the velocity ratio of the two plates established by the different pitches of the lead screws.

Figure 6A:
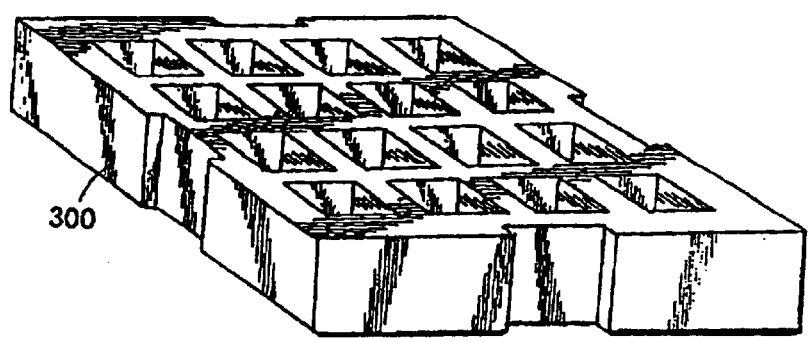
Figure 6B:
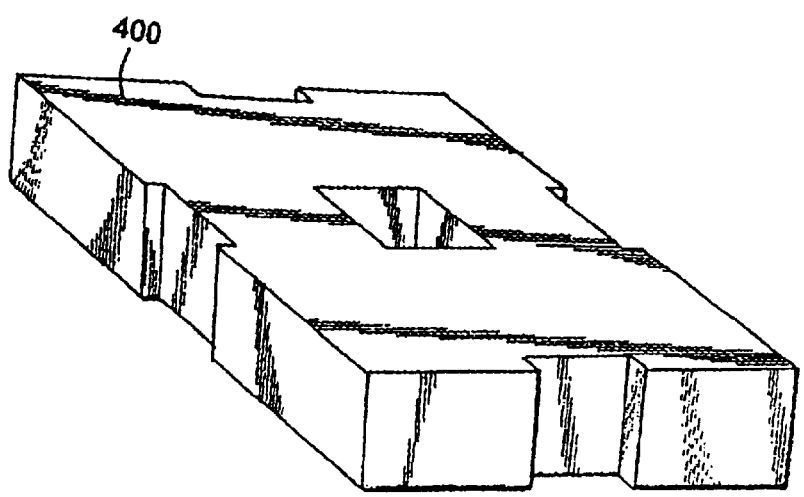
FIG. 6(b) is a perspective view of a simplified version of the planar part with one molded-in hole at its center.
Figure 7:
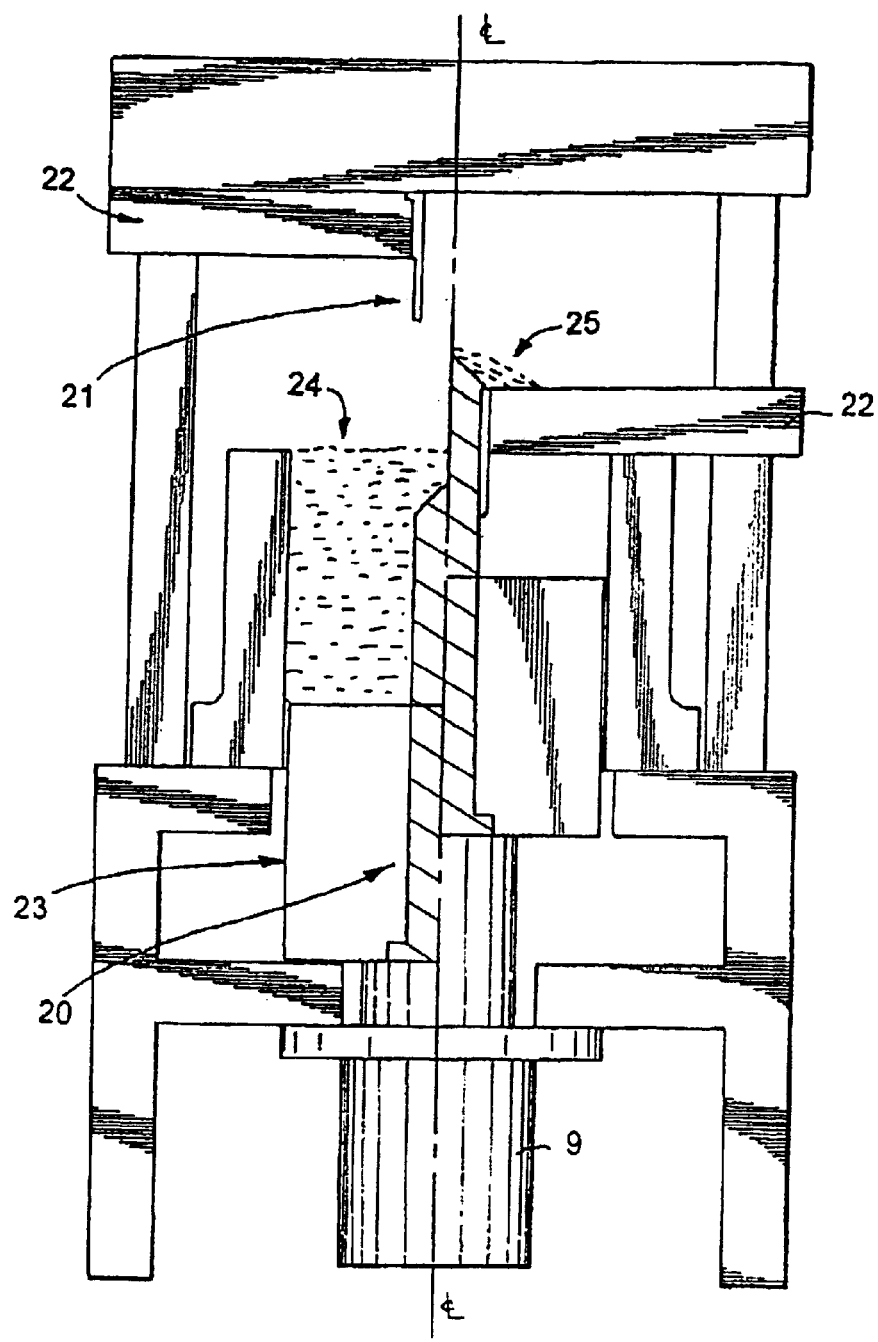

FIG. 7 depicts a molding apparatus which is not an embodiment of the present invention, but which includes a loose core that forms an opening completely through a planar part. Such a loose core may advantageously be used together with the present invention for forming openings through formed parts. FIGS. 6(a) and 6(b) depict planar parts (also not according to the present invention) having opening(s) defined there through such as may be formed using a loose core, and specifically FIG. 6(a) is a perspective view of planar part (300) with numerous molded-in holes forming a lattice pattern, while FIG. 6(b) is a perspective view of a simplified planar part (400) with one molded-in hole at its center and which is formed using the apparatus of FIG. 7. In FIG. 7, a split cross-sectional front view of the molding apparatus is presented, with the left half of FIG. 7 showing the apparatus in a pre-molding condition, and the right half of FIG. 7 showing the apparatus in a fully compacted condition.

The four notches defined in the four edges of the parts (300), (400) are artifacts from wear plates of the molding apparatus, such as the wear plates (11) already explained in relation to the embodiment apparatus of FIG. 3. The molding apparatus of FIG. 7 is similar to the apparatus shown in FIG. 1, except that only one movable core plate (23) is used, corresponding to the fact that the planar part (400) has only one thickness and the added features of core pin (20) and sleeve (21) installed through an open hole in the cover plate (22). The left half of FIG. 7 shows the start of molding cycle with the cover plate (22) raised open, and the core plate (23) with embedded core pin (18) fully retracted.

Before operation of the molding apparatus in FIG. 7, the charge or furnish of CMC is filled up to a rim (24) of a wall frame (5) of the apparatus. An upper end of the core pin (20) is completely buried under the charge, making it easy to level the charge along the rim (24) for uniform and consistent charge distribution. At the beginning of the molding operation, the cover plate (22) is closed via an hydraulic actuator or the like (not shown), whereby the thin sleeve (21) will penetrate through the CMC charge, stopping just above the sharp tip of the core pin (20). The sharp tip of the core pin (20) may help penetrate through the CMC charge, but can be eliminated for most cases. Afterwards, the core plate (23) together with the core pin (20) is moved up via the hydraulic cylinder actuator (9), compacting the charge. The actuator (9) is controlled by a controller such as a PLC (not shown). The core pin (20) is guided through the sleeve (21). Some of charge (25) may be pushed over the top of cover plate (22), and may be removed easily in such case.

Figure 9A:
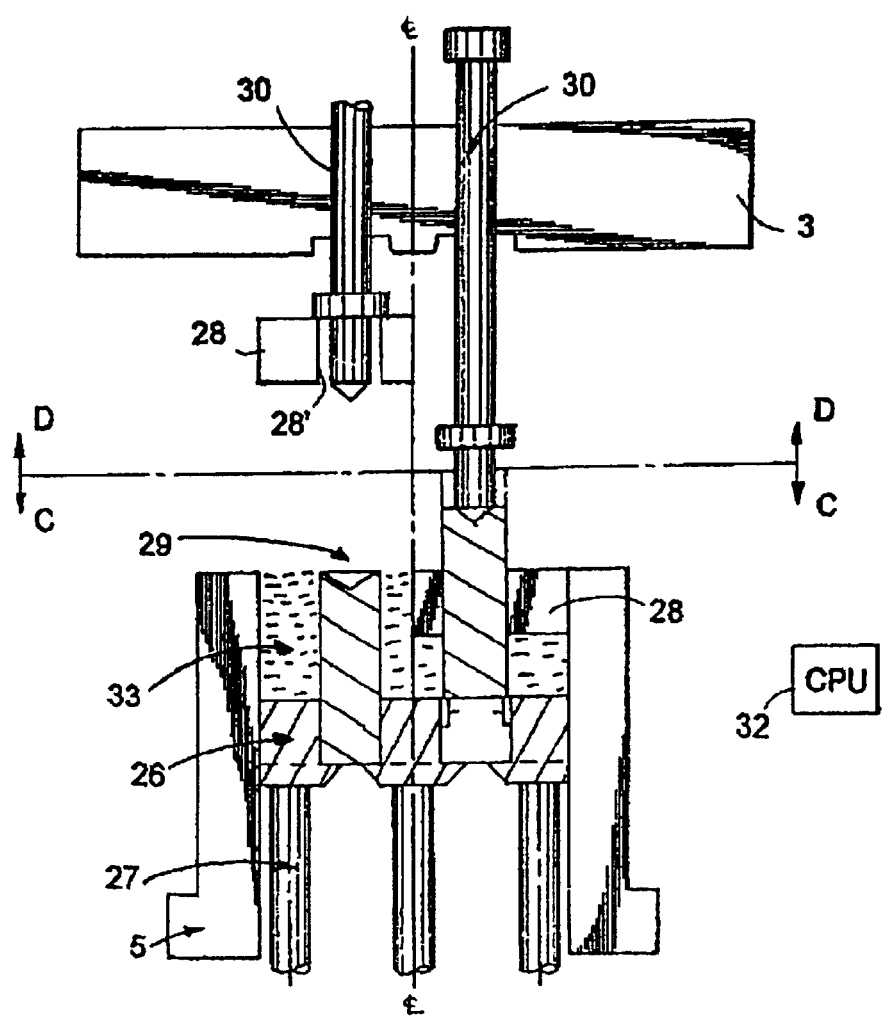
FIGS. 9(a)(b)(c) and (d) show a compaction molding apparatus including loose cores according to another embodiment of the invention which is used to produce the part shown in FIG. 8, and specifically
Figure 9B:
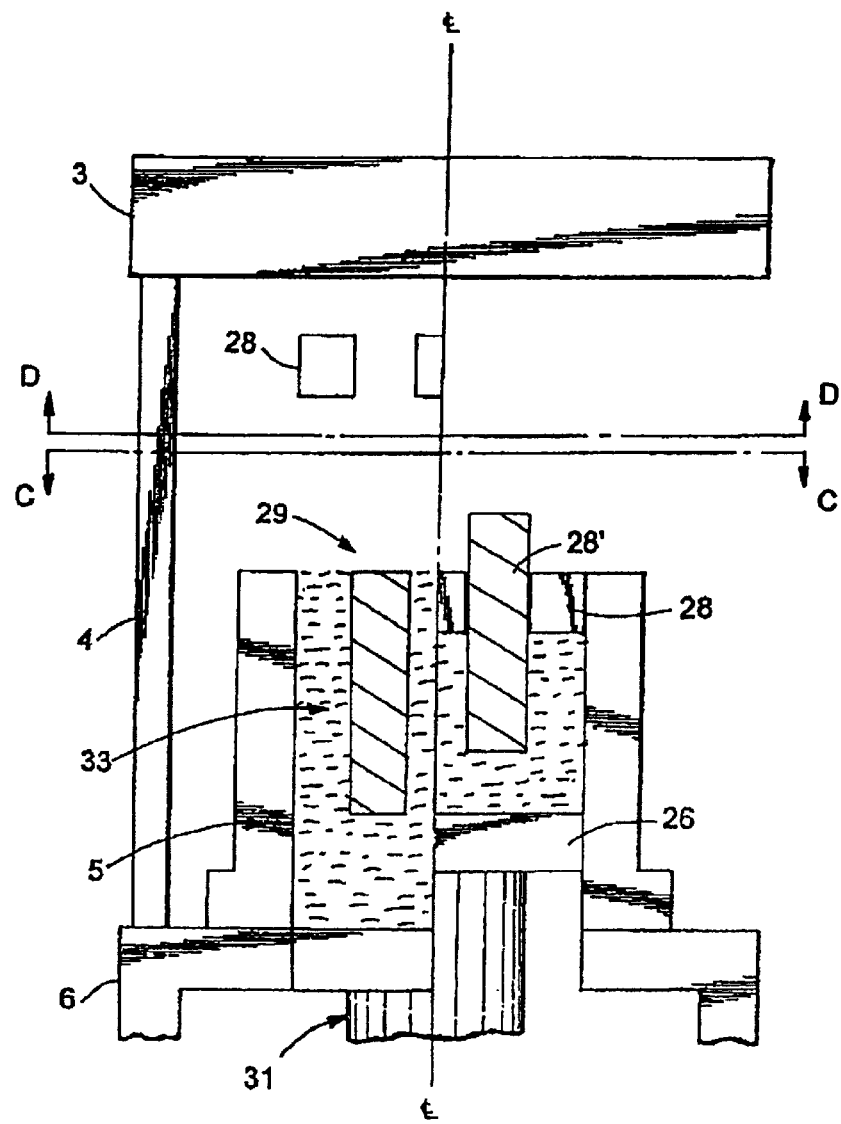
FIGS. 9(c) and 9(d) are planar cross-sectional views of the apparatus looking in the direction of lines C—C (upwardly) and D—D (downwardly), respectively, in FIGS. 9(a) and 9(b).
Figure 9C:
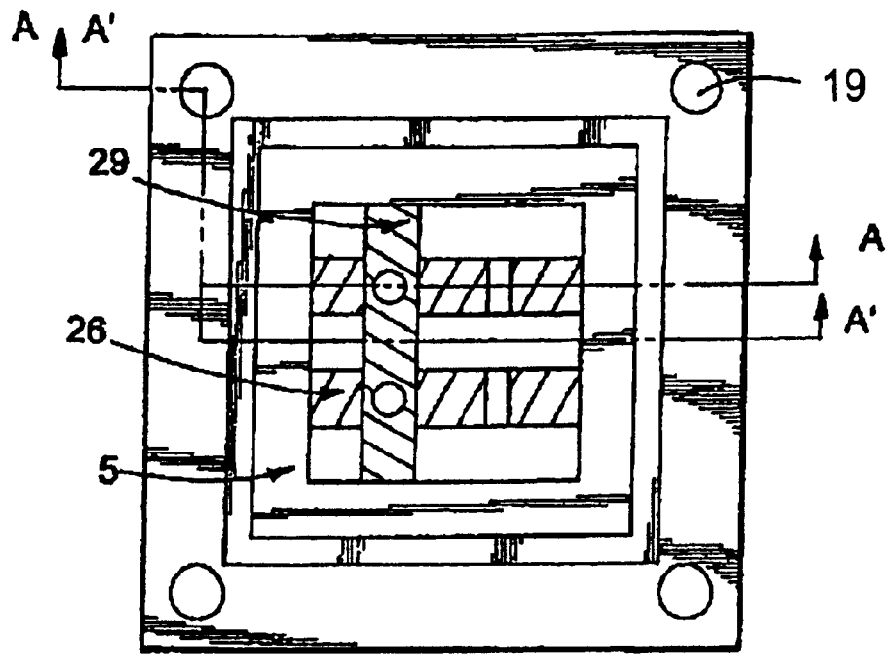
Figure 9D:
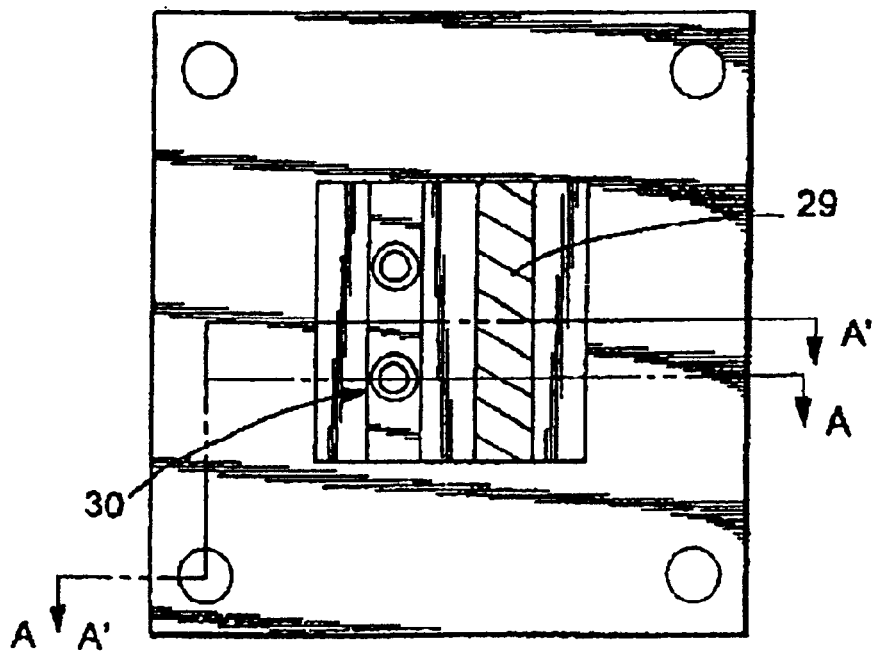

Referring to FIGS. 9(a) through 9(d) and FIG. 8, there are respectively shown a molding apparatus according to another embodiment of the invention and a part (500) molded using the apparatus. Specifically, FIG. 9(a) is a split cross-sectional front view of the apparatus taken along line A—A in FIGS. 9(c) and 9(d) showing the state of the apparatus at the beginning (left side) and end (right side) of a compacting operation, FIG. 9(b) is similarly a split cross-sectional rear view of the apparatus taken along line A'—A' in FIGS. 9(c) and 9(d) showing the state of the apparatus at the beginning (left side) and end (right side) of a compacting operation, while FIGS. 9(c) and 9(d) are planar cross-sectional views of the apparatus looking in the direction of lines C—C (downwardly) and D—D (upwardly), respectively, in FIGS. 9(a) and 9(b).

Such apparatus and part (500) according to this embodiment are more complex than those in the embodiments of FIGS. 1–3, and 4–5(b). The added complexity of the part (500) in comparison to either of the parts (100) and (200) is due not only to the fact that the part has three different thicknesses corresponding to the distances among the four horizontal planes, or distinct levels of Z-coordinates, (a, b, c, and d), but also due to the fact that the thickness between the a and c planes must be cored out in order to produce the thickness (cd), which may be accomplished with the use of loose cores as discussed below.

As shown, the molding apparatus of FIGS. 9(a)–9(d) includes: upper fixed platen (3); wall frame (5) which is bolted or otherwise fixed to pedestal (6); cover plate or platen (28) which is preferably movable via pick-up fingers (30); a plurality of tie bars (4) such as the tie bars (4) in FIG. 1; a stationary plate or platen (26) supported by pillar blocks (27); loose cores (29) which make a net upward movement relative to stationary components of the molding apparatus through openings (28') in the cover plate (28); independently actuatable pick-up fingers (30) which pick up and move the loose cores (29), and also preferably move the cover platen (28); a plunger (31) which is movable upwardly by an hydraulic cylinder or the like (not shown); and a controller (32) such as a PLC which controls the various moving components of the molding apparatus according to predetermined program(s), data table(s), etc. stored therein.

In operation of the molding apparatus of FIGS. 9(a)–9(d), CMC furnish or charge (33) is filled in the molding cavity of the apparatus, and the loose cores (29) are placed above the charge (33) in the left half of each of FIGS. 9(a) and (b). The plane (c) of the part (500) in FIG. 8 will be a stationary material plane, and is provided by the stationary platen (26) supported by the pillar blocks (27), as shown in FIG. 9(a). When the loose cores (29) sit on stationary platen (26) as shown in the left half of FIG. 9(a), the top of the loose core becomes flush with the top rim of the wall frame (5), facilitating leveling of the CMC charge (33). The loose cores (29) can be locked to the independently actuated pick-up fingers (30). The locking and unlocking of the pick-up fingers (30) to the loose cores (29) may be accomplished by such mechanisms as taught in U.S. Pat. Nos. 3,516,302 and 3,706,116, the disclosures of which are incorporated herein by reference. Details of implementing such a mechanism are not shown in the FIG. 9, but are straightforward and routine for those who are skilled in the art. The positions of significant components at full charge, just before the cover plate closing, is shown in the left half of FIGS. 9(a) and (b). FIGS. 9(c) and (d) show the location of viewing planes. As the cover plate (28) is closed and the plunger (30) begins upward compaction of the CMC charge (33), the cover plate (28) itself and the loose cores (29) must also make coordinated movements together with the plunger (30) in order to satisfy the conditions for UUC deformation. This is preferably accomplished by the action of the pickup fingers (30) under the control of controller (32), as depicted. The final placements of significant components of the molding apparatus at the completion of the compaction or molding operation is shown in the right halves of FIGS. 9(a) and (b).

As will be understood, this embodiment of the molding apparatus according to the present invention involves coordinated movements of the plunger (31), cover plate (28) and loose cores (29) along a single axis (e.g., a vertical or Z axis), just as the movable core plates (7, 8) in the embodiment of FIG. 1 and the movable core plates (14, 15) in the embodiment of FIGS. 5(a), 5(b) move along a single axis. In the embodiment of FIGS. 9(a)–9(d), however, the components (29) and (31) move upwardly and the component (28) moves downwardly along the same axis in coordination, whereas in the other embodiments the movable cores (7, 8) and (14, 15) move in the same direction along the same axis.

Figure 10:
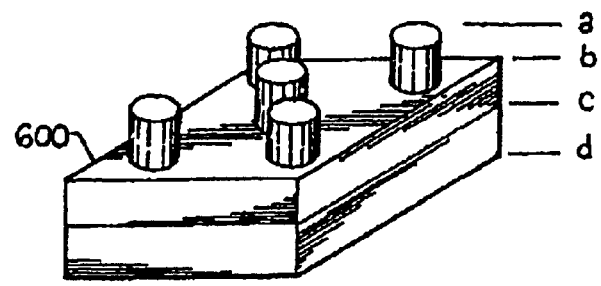
FIG. 10 is a perspective view of a part with dual density produced by a two stage operation of yet another molding apparatus according to the invention.
Figure 11:
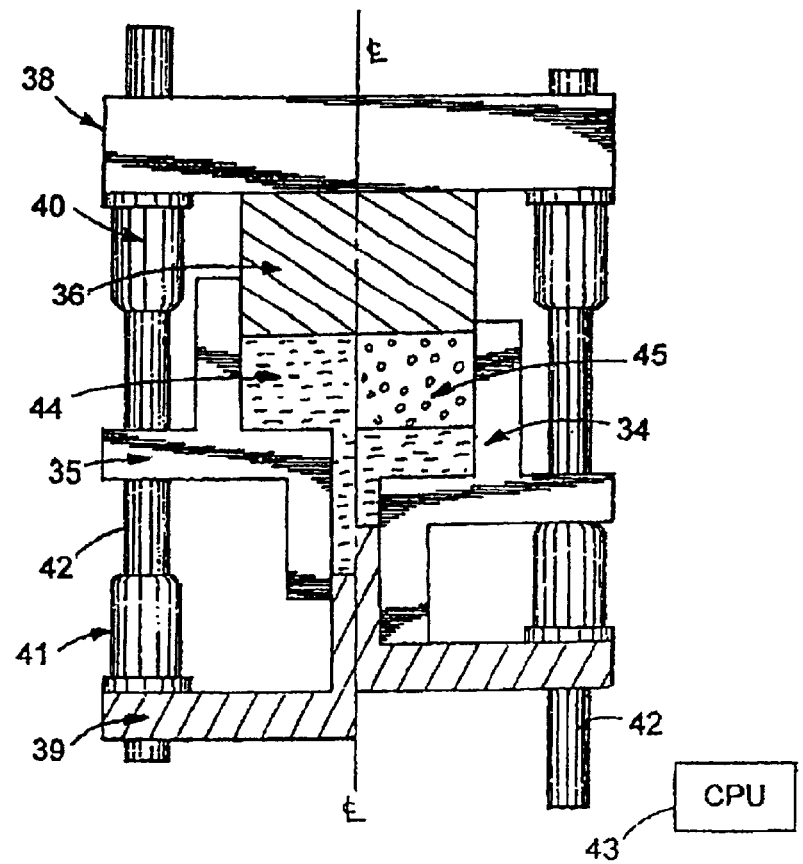
FIG. 11 is a split cross-sectional front view of the molding apparatus used to form the part of FIG. 10, where the left half of FIG. 11 shows the apparatus in a pre-molding condition before the start of the first molding stage (which forms the sections of the part in planes a, b and c), while the right half of FIG. 11 shows the apparatus at the start of the second molding stage (which forms the section of the part in planes c, d).

Referring to FIG. 11 and FIG. 10, there are respectively shown a molding apparatus according to still another embodiment of the invention and a part (600) molded using the apparatus. Specifically, FIG. 10 is a perspective view of the part (600) which has sections with different densities produced by a two stage operation of the molding apparatus. FIG. 11 is a split cross-sectional front view of the molding apparatus, with the left half of FIG. 11 showing the apparatus in a pre-molding condition before the start of the first molding stage (which forms the sections of the part (600) in horizontal planes a, b and c having one density), while the right half of FIG. 11 shows the apparatus at the start of the second molding stage (which forms the section of the part (600) in planes c, d having a different density). By changing the compaction ratio in the first and second stages, dual density molding can be accomplished.

Referring to FIG. 11, the molding apparatus according to this embodiment comprises: wall frames (34, 35); cover plate (36) movable downwardly between upper sections of the wall frames (34, 35); upper platen (38) to which the cover plate (36) is fixed; plunger platen (39) having an upper section which is movable upwardly between lower sections of the wall frames (34, 35); tie bars (42) interconnecting the upper platen (38) and the plunger plate or platen (39); hydraulic yoke cylinders (40) and (41) mounted directly on the tie bars (42) for actuating movements of the upper platen (38) and the plunger plate (39); and controller (43) such as a PLC which controls the various moving components of the molding apparatus according to predetermined program(s), data table(s), etc. stored therein.

The left half of FIG. 11 shows the start or first stage molding with the CMC charge or furnish (44) disposed in the molding cavity. In this first stage, the charge (44) does not completely fill the cavity and the cover plate (36) starts the molding at a recessed position, and compaction of the charge (44) is accomplished by the coordinated UCC movements of the cover plate (36) downwardly and plunger plate (39) upwardly along the same (Z) axis, leaving the material b plane stationary. The right half of FIG. 11 shows the positions of significant components of the molding apparatus at the start of the second molding stage at full charge. As shown, a new charge of CMC (45) has been added in the cavity up to the rim of the wall frame (33) on top of the molded section of the part (600) from the first stage. In the second stage, the plunger plate (39) will be locked stationary and only the cover plate (36), as moved by the upper platen (38) will compact the new charge (45), adding a uniform thickness section of the part (600) on top of the already molded section. In this embodiment of present invention the wall frame (35) and the tie bars (42) remain stationary. The hydraulic cylinder actuators (40, 41) make coordinated UCC movement during the first molding stage, but not during the second molding stage. The actuators (40, 41) are in any event capable of independent movement during the second stage.

Advantages of the Present Invention

Parts molded according to the present invention, involving coordinated UCC movement of the CMC material during a molding operation, are quite distinct from parts that have conventionally been made using various CMC materials in that the parts formed according to the invention can have complex, non-planar shapes, as well as uniform density therethrough (or through at least sections thereof) despite their complex shapes, which results in high quality. In contrast, parts conventionally formed using CMC materials have been planar or substantially planar, and suffer from reduced quality to any extent they are not planar.

Moreover, in the present invention, the uniform compacting deformation is efficiently and economically accomplished in one step where all moving actuators responsible for forming a part move simultaneously in coordination, i.e., parallel to each other along a given axis such that the velocity ratios of all moving parts are precisely maintained and the relative positions of all moving parts follow precisely predetermined trajectories. In contrast, conventional methods and methods of forming non-planar parts are relatively complex and/or inefficient, and parts formed therewith often suffer from inferior quality.

Although the present invention has been described herein with respect to various embodiments thereof, the foregoing description is intended to be illustrative, and not restrictive. Those skilled in the art will realize that many modifications of the disclosed embodiments could be made which would not depart from the gist, spirit or essence of the present invention. All such modifications which are within the scope of the claims are intended to be within the scope and spirit of the present invention.

For example, some possible modifications include: using electrical motors or pneumatic cylinders as actuators for respectively moving each of the movable platens in coordinated movements, rather than using the hydraulic cylinders or the double pitched lead screws as described above; parts with more than two sections of different densities could be formed; slide(s) may optionally be incorporated into the molding apparatus for causing compaction of CMC materials in a direction other than the direction/axis of uniform, unidirectional compaction; etc.

Further, while the embodiments of the invention as described above involve an actuating mechanism which simultaneously moves two or more plates at different respective velocities in the same or parallel directions to achieve UUC, it will be understood by persons skilled in the art that the actuating mechanism could alternately or sequentially move the plates in small increments in repeated cycles so as to achieve the same practical effect as moving the plates simultaneously, especially if the increments are very small and the cycles are very short. The language "moves the plates substantially simultaneously" as used herein is meant to encompass simultaneous movement as well as such alternate or sequential movement in repeated cycles.

I claim:

1. A molding apparatus for producing non-planar parts using compaction molding compound (CMC), the apparatus comprising:

a mold having a cavity which receives CMC therein;

the mold including a movable platen assembly having at least two plates movable in substantially parallel directions to compact CMC placed in the cavity; and an actuating mechanism which moves the plates substantially simultaneously at different respective velocities such that the CMC is substantially uniformly compacted into a non-planar shape with a predetermined, substantially uniform density;

wherein said actuator comprises a rotatable lead screw having multiple threaded sections with different thread pitches, said sections operatively moving the plates, respectively, when the lead screw is rotated.

2. The molding apparatus according to claim 1, further comprising a loose molding insert disposable with the CMC in the mold cavity during a molding operation to define a surface of a part molded with the apparatus.

3. The molding apparatus according to claim 1, wherein said actuating mechanism moves the plates at a constant velocity ratio relative to each other during a molding operation.

4. The molding apparatus according to claim 1, further comprising:
- at least one cavity surface which remains stationary during a molding operation; and
- guide members operatively associated with at least one of said cavity surface and said movable platen assembly.

5. The molding apparatus according to claim 4, wherein said guide members include a wear plate connected to one of said cavity surface and said movable platen assembly, and a gib connected to the other of said cavity surface and said movable platen assembly, and operatively engaging said wear plate.

6. The molding apparatus according to claim 1, wherein said CMC comprises a mixture including grain hulls and a binder.

7. The molding apparatus according to claim 1, wherein said actuating mechanism is operable to move the plates such that a rate of compaction is substantially the same for all portions of the CMC at any given time during a molding operation.

8. The molding apparatus according to claim 1, wherein the mold comprises a plurality of linear displacement transducers for dynamically measuring the respective positions of the movable plates.

9. The molding apparatus of claim 1, further comprising a movable cover plate having holes formed therein in selected areas thereof, wherein movement of the movable cover plate is guided on a plurality of parallel tie bars, which extend through the respective holes formed therein.

* * * * *